(12) United States Patent
Yoshikawa et al.

(10) Patent No.: US 11,223,260 B2
(45) Date of Patent: Jan. 11, 2022

(54) MOLDED COIL BODY WITH COIL AND SEMIANNULAR BUSBARS INTEGRALLY CONNECTED WITH COILS IN THE MOLDED COIL BODY

(71) Applicant: Panasonic Intellectual Property Management Co., Ltd., Osaka (JP)

(72) Inventors: Yuichi Yoshikawa, Osaka (JP); Keiichiro Nukada, Nara (JP); Hirokazu Yamauchi, Osaka (JP); Mitsuoki Hishida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/475,727

(22) PCT Filed: Nov. 2, 2017

(86) PCT No.: PCT/JP2017/039707
§ 371 (c)(1),
(2) Date: Jul. 3, 2019

(87) PCT Pub. No.: WO2018/135086
PCT Pub. Date: Jul. 26, 2018

(65) Prior Publication Data
US 2020/0212770 A1 Jul. 2, 2020

(30) Foreign Application Priority Data

Jan. 18, 2017 (JP) .............................. JP2017-006957

(51) Int. Cl.
*H02K 15/04* (2006.01)
*B21D 22/02* (2006.01)
(Continued)

(52) U.S. Cl.
CPC ......... *H02K 15/0407* (2013.01); *B21D 22/02* (2013.01); *B22D 25/02* (2013.01);
(Continued)

(58) Field of Classification Search
CPC ............ H02K 3/50; H02K 3/505; H02K 3/52; H02K 3/521; H02K 3/522; H02K 3/524;
(Continued)

(56) References Cited

U.S. PATENT DOCUMENTS 7,855,484 B2* 12/2010 Sasaki .................... H02K 3/522
310/194
2005/0236921 A1* 10/2005 Yoneda .................. H02K 3/522
310/179

(Continued)

FOREIGN PATENT DOCUMENTS

CN 102577035 A 7/2012
DE 102012212637 1/2014
(Continued)

OTHER PUBLICATIONS

International Search Report of PCT application No. PCT/JP2017/039707 dated Jan. 16, 2018.
(Continued)

*Primary Examiner* — Maged M Almawri
(74) *Attorney, Agent, or Firm* — McDermott Will and Emery LLP

(57) ABSTRACT

The invention provides a coil molding attached to a stator of a motor, the coil molding including a coil wound around each of teeth of the stator, and a bus bar connected to the coil and molded integrally with the coil. The invention also provides another coil molding attached to a stator of a motor, the coil molding including a set of coils wound respectively around a plurality of teeth of the stator, the set of coils being molded integrally with each other.

12 Claims, 16 Drawing Sheets

(51) Int. Cl.
  *B22D 25/02* (2006.01)
  *H02K 1/14* (2006.01)
  *H02K 1/27* (2006.01)
  *H02K 3/26* (2006.01)
  *H02K 3/52* (2006.01)
  *H02K 15/00* (2006.01)
  *H02K 21/16* (2006.01)

(52) U.S. Cl.
  CPC .......... *H02K 1/146* (2013.01); *H02K 1/276* (2013.01); *H02K 3/26* (2013.01); *H02K 3/522* (2013.01); *H02K 15/0062* (2013.01); *H02K 21/16* (2013.01); *H02K 2203/09* (2013.01)

(58) Field of Classification Search
  CPC .......... H02K 3/525; H02K 3/46; H02K 3/28; H02K 3/18; H02K 1/146; H02K 1/2706; H02K 15/0407; H02K 15/0062; H02K 1/276; H02K 21/16; H02K 2203/09; B21D 22/02; B22D 25/02
  USPC .......................................... 310/71, 180–208
  See application file for complete search history.

(56) References Cited

U.S. PATENT DOCUMENTS

| | | | | |
|---|---|---|---|---|
| 2005/0236922 | A1* | 10/2005 | Yoneda | H02K 3/522 310/179 |
| 2005/0248228 | A1* | 11/2005 | Yoneda | H02K 3/522 310/179 |
| 2006/0138883 | A1 | 6/2006 | Yagai et al. | |
| 2008/0201935 | A1 | 8/2008 | Nakayama et al. | |
| 2010/0052461 | A1* | 3/2010 | Sasaki | H02K 3/522 310/215 |
| 2011/0068647 | A1* | 3/2011 | Sakaue | H02K 3/28 310/71 |
| 2011/0297474 | A1* | 12/2011 | Aono | H02K 3/522 180/443 |
| 2012/0217836 | A1 | 8/2012 | Watanabe et al. | |
| 2015/0155750 | A1 | 6/2015 | Hashimoto et al. | |
| 2015/0162793 | A1 | 6/2015 | Hashimoto et al. | |
| 2017/0155296 | A1 | 6/2017 | Nakamasu et al. | |

FOREIGN PATENT DOCUMENTS

| | | |
|---|---|---|
| DE | 102013205240 A1 | 9/2014 |
| EP | 1035630 | 9/2000 |
| EP | 1729398 A2 | 12/2006 |
| EP | 2387135 A2 | 11/2011 |
| EP | 2827476 A1 | 1/2015 |
| EP | 2833520 A1 | 2/2015 |
| JP | 2000-324739 | 11/2000 |
| JP | 2004-336969 A | 11/2004 |
| JP | 2006-187175 A | 7/2006 |
| JP | 2007-267463 | 10/2007 |
| JP | 2008-211880 | 9/2008 |
| JP | 2010-016970 | 1/2010 |
| JP | 2010-110122 A | 5/2010 |
| JP | 2014-007829 | 1/2014 |
| JP | 2014-207860 | 10/2014 |
| JP | 2015-002614 A | 1/2015 |
| JP | 2016-028550 | 2/2016 |
| JP | 2017-158384 | 9/2017 |
| WO | 2014/111179 A2 | 7/2014 |

OTHER PUBLICATIONS

The Extended European Search Report dated Sep. 18, 2019 for the related European Patent Application No. 17893300.8.
Communication pursuant to Article 94(3) EPC dated Nov. 19, 2020 for the related European Patent Application No. 17893300.8.
Groninger Met al : "Casting production of coils for electrical machines", Electric Drives Production Conference (EDPC), 2011 1st International, IEEE, Sep. 28, 2011 (Sep. 28, 2011), pp. 159-161, XP032000385.
English Translation of Chinese Search Report dated Dec. 11, 2020 for the related Chinese Patent Application No. 201780083417.0.
Communication pursuant to Article 94(3) EPC dated Sep. 14, 2021 for the related European Patent Application No. 17893300.8.

\* cited by examiner

MOLDED COIL BODY WITH COIL AND SEMIANNULAR BUSBARS INTEGRALLY CONNECTED WITH COILS IN THE MOLDED COIL BODY

CROSS-REFERENCE TO RELATED APPLICATIONS

This application is a U.S. national stage application of the PCT International Application No. PCT/JP2017/039707 filed on Nov. 2, 2017, which claims the benefit of foreign priority of Japanese patent application 2017-006957 filed on Jan. 18, 2017, the contents all of which are incorporated herein by reference.

TECHNICAL FIELD

A technique disclosed herein relates to a coil molding attached to a stator of a motor, a method of manufacturing the same, the motor, and a method of assembling the stator.

BACKGROUND ART

There have been increasing demands for motors as industrial motors and in-vehicle motors. Demanded in this situation are efficiency improvement and cost reduction of the motors.

There has been known, as a technique for motor efficiency improvement, increase in space factor of a coil disposed in a slot of a stator. Such increase in space factor of the coil leads to inhibition of loss due to current flowing to the coil upon motor drive.

There has been proposed, as a technique for increase in space factor of a coil, disposition of a cast coil made of a copper material in a slot (see PTL 1 or the like).

Cost reduction of the motors may be achieved through assembling cost reduction or the like. The motor assembling cost is increased mainly due to stator manufacturing cost, particularly a process of winding a coil and a process of connecting the coil and a bus bar, each of which needs dedicated equipment.

PTL 1 discloses a conventional technique that does not include any solution to this problem.

CITATION LIST

Patent Literature

PTL 1: Unexamined German Patent Publication No. 102012212637

SUMMARY OF THE INVENTION

Disclosed herein is a technique devised in view of such problems. It is an object of the present disclosure to provide a coil molding manufactured at low cost, and a method of manufacturing the coil molding.

In order to achieve this object, the technique disclosed herein adopts, as a stator coil of a motor, at least either a plurality of coils or a coil molding including a coil and a bus bar molded integrally.

Specifically, the present disclosure provides a coil molding attached to a stator of a motor, the coil molding including a coil wound around each of teeth of the stator, and a bus bar connected to the coil and molded integrally with the coil, the bus bar having a substantially semiannular shape when viewed from a central axis of the motor.

This configuration includes the coil and the bus bar molded integrally, and thus eliminates a process of winding the coil and a process of connecting the coil and the bus bar for reduction in motor manufacturing cost.

The present disclosure provides another coil molding including a set of coils wound respectively around a plurality of teeth, the set of coils being molded integrally with each other.

This configuration includes the plurality of coils molded integrally, and thus eliminates a process of winding the coils and a process of connecting the coils for reduction in motor manufacturing cost.

The present disclosure provides a motor including a cover case accommodating a shaft, a rotor provided in contact with an outer circumference of the shaft, and a stator disposed outside the rotor and constantly spaced apart from the rotor. The stator includes a stator core having a substantially annular shape, a plurality of teeth provided at equal intervals along an inner circumference of the stator core, slots each provided between the teeth, and the coil molding attached to the teeth and disposed in the slots.

This configuration achieves the motor including the coil molding manufactured without a process of winding coils and a process of connecting the coil and a bus bar or connecting the coils, for reduction in motor manufacturing cost.

The present disclosure facilitates a manufacture process of a motor, particularly of a stator, through elimination of a process of winding coils and a process of connecting the coil and a bus bar or connecting the coils, for reduction in motor manufacturing cost.

DESCRIPTION OF EMBODIMENTS

Exemplary embodiments of the present disclosure will be described in detail below with reference to the drawings. The following preferred exemplary embodiment is essentially described merely exemplarily, without intention of limiting the present invention, elements obtained by applying the present invention, or purposes of the present invention.

Exemplary Embodiment (Structure of Motor)

Figure 1A:
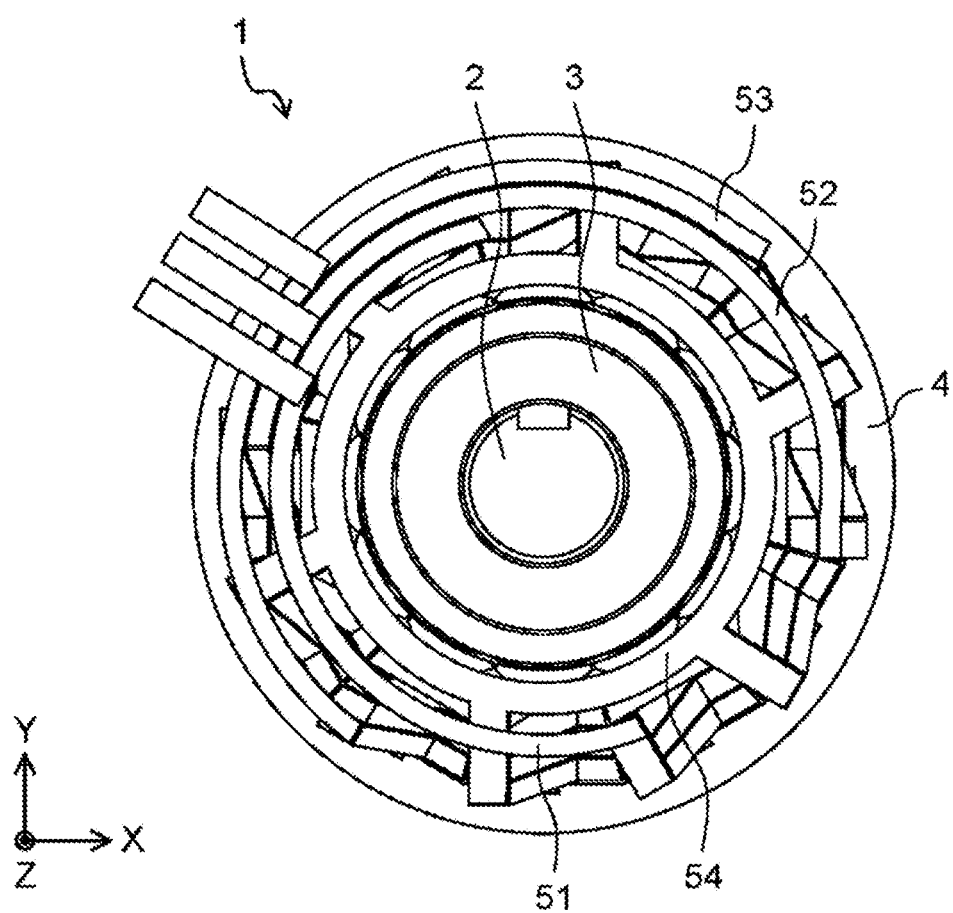
FIG. 1A is a top view of a motor according to an exemplary embodiment.
Figure 1B:
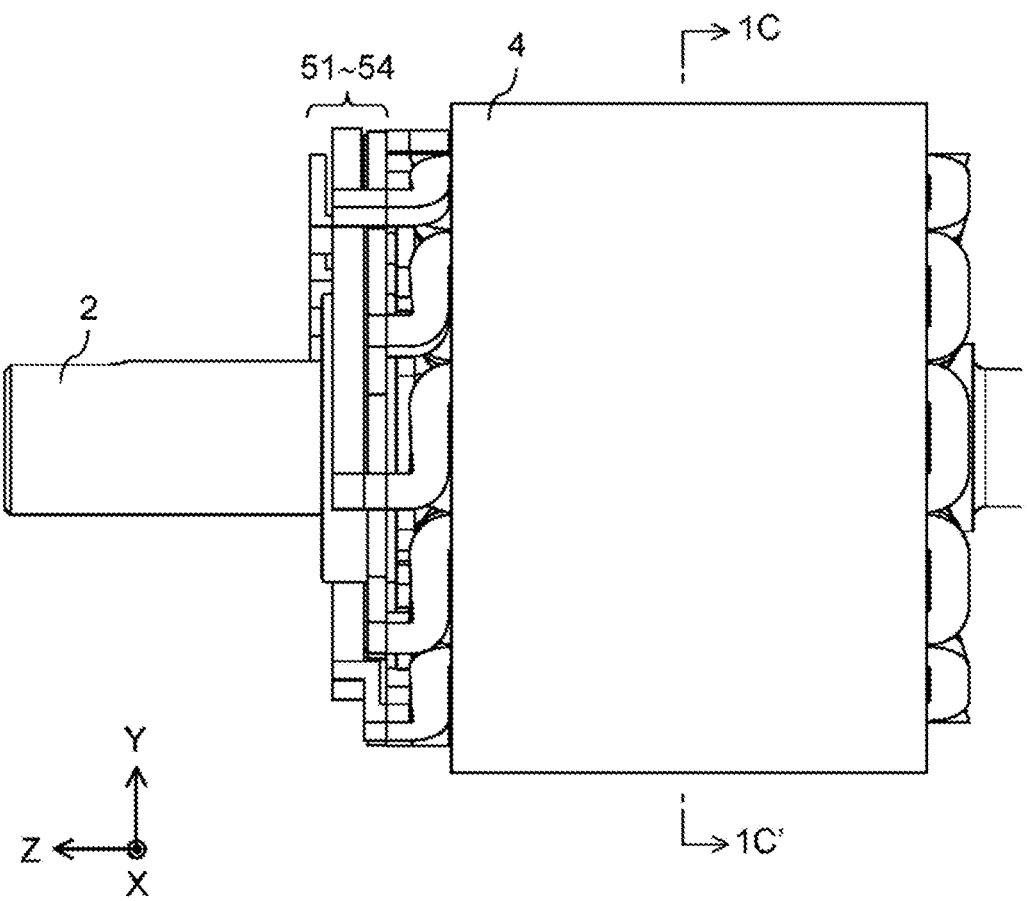
FIG. 1B is a side view of the motor according to the exemplary embodiment.
Figure 1C:
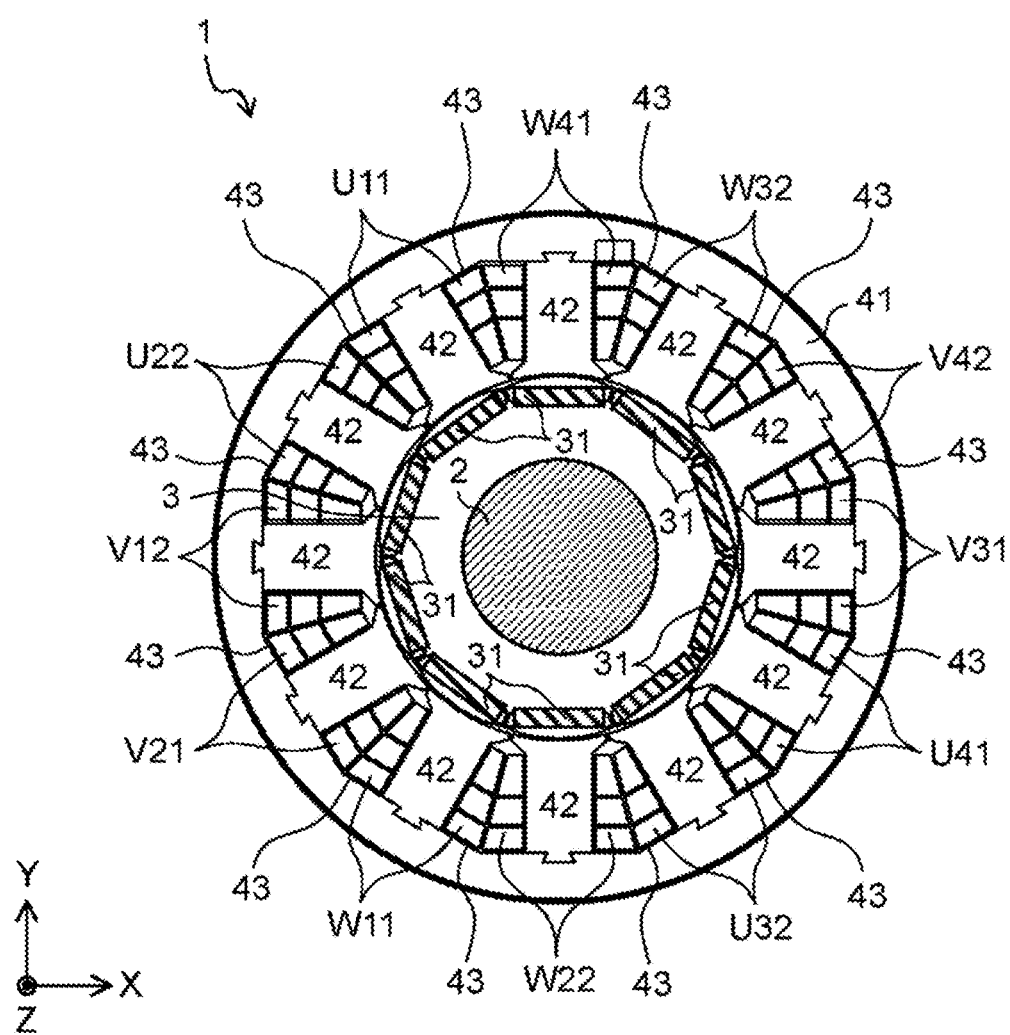
FIG. 1C is a sectional view taken along line 1C-1C' indicated in FIG. 1B.

FIG. 1A is a top view of a motor according to the exemplary embodiment. FIG. 1B is a side view of the motor according to the exemplary embodiment. FIG. 1C is a sectional view taken along line 1C-1C' indicated in FIG. 1B. None of these figures depicts a cover case or the like. Motor 1 includes rotor 3, shaft 2, stator 4, coils U11 to U41, V12 to V42, W11 to W41, and bus bars 51 to 54, which are accommodated in a cover case (not depicted).

The following description refers to a Z-axis direction that is parallel to a longitudinal direction (vertical to a drawing sheet) of shaft 2 as depicted in FIG. 1A. The following description also refers to an X-axis direction and a Y-axis direction that are perpendicular to the Z-axis direction (parallel to the drawing sheet). The X-axis direction is perpendicular to the Y-axis direction.

The expression "integration" or "integrated" means a state of a single object including a plurality of components mechanically connected by means of bolting, caulking, or the like, a single object including components electrically connected by means of material joining such as covalent bonding, ionic bonding, or metallic bonding, or an object including all components electrically connected by means of material joining such as melting.

Rotor 3 is in contact with an outer circumference of shaft 2. Rotor 3 includes magnets 31 facing stator 4 and having N-poles and S-poles alternately disposed along the outer circumference of shaft 2. The present exemplary embodiment adopts neodymium magnets as magnets 31 included in rotor 3, although magnets 31 may be modified appropriately in accordance with motor output or the like in terms of material, shape, and quality of the material.

Stator 4 includes stator core 41 having a substantially annular shape, a plurality of teeth 42 provided at equal intervals along an inner circumference of stator core 41, and slots 43 each provided between adjacent teeth 42. Stator 4 is disposed outside rotor 3 so as to be constantly spaced apart from rotor 3 in the Z-axis direction.

Stator core 41 is prepared by stacking electromagnetic steel sheets containing silicon or the like and subsequently punching the electromagnetic steel sheets.

Rotor 3 according to the present exemplary embodiment has totally ten magnetic poles including five N-poles and five S-poles each facing stator 4. There are provided twelve slots 43. The present disclosure should not be particularly limited to the number of magnetic poles of rotor 3 or the number of slots 43, but is applicable to any combination of a different number of magnetic poles and a different number of slots.

Stator 4 has twelve coils U11 to U41, V12 to V42, W11 to W41. Each of coils U11 to U41, V12 to V42, W11 to W41 is attached to a corresponding one of teeth 42, and is disposed in a corresponding one of slots 43 when viewed in the Z-axis direction. Coils U11 to U41, V12 to V42, W11 to W41 thus have concentrated winding relatively to teeth 42. Furthermore, coils U11 to U41, V12 to V42, W11 to W41 are integrated with bus bars 51, 52, 53, respectively.

Reference mark UPQ, VPQ, WPQ denoting a coil includes a first letter indicating a phase (a U-phase, a V-phase, or a W-phase in the present exemplary embodiment) of motor 1. A second letter indicates a coil array order in the corresponding phase. A third letter indicates a coil winding direction, and the present exemplary embodiment provides 1 indicating a clockwise direction and 2 indicating a counterclockwise direction. Coil U11 accordingly corresponds to a coil having a first coil array order in the U-phase and a clockwise winding direction. Coil V42 corresponds to a coil having a fourth coil array order in the V-phase and a counterclockwise winding direction. The expression "clockwise" indicates right-handed rotation and the expression "counterclockwise" indicates left-handed rotation when viewed from a center of motor 1.

Strictly, coils U11, U41 are coils in the U-phase, and coils U22, U32 are coils in a U-bar phase (generating a magnetic field opposite to a magnetic field of a U-phase coil). The following description will generically call these coils as U-phase coils unless otherwise specified. Similarly, coils V12 to V42 and coils W11 to W41 will be generically called V-phase coils and W-phase coils, respectively.

(Details of Coil Molding)

Figure 2:
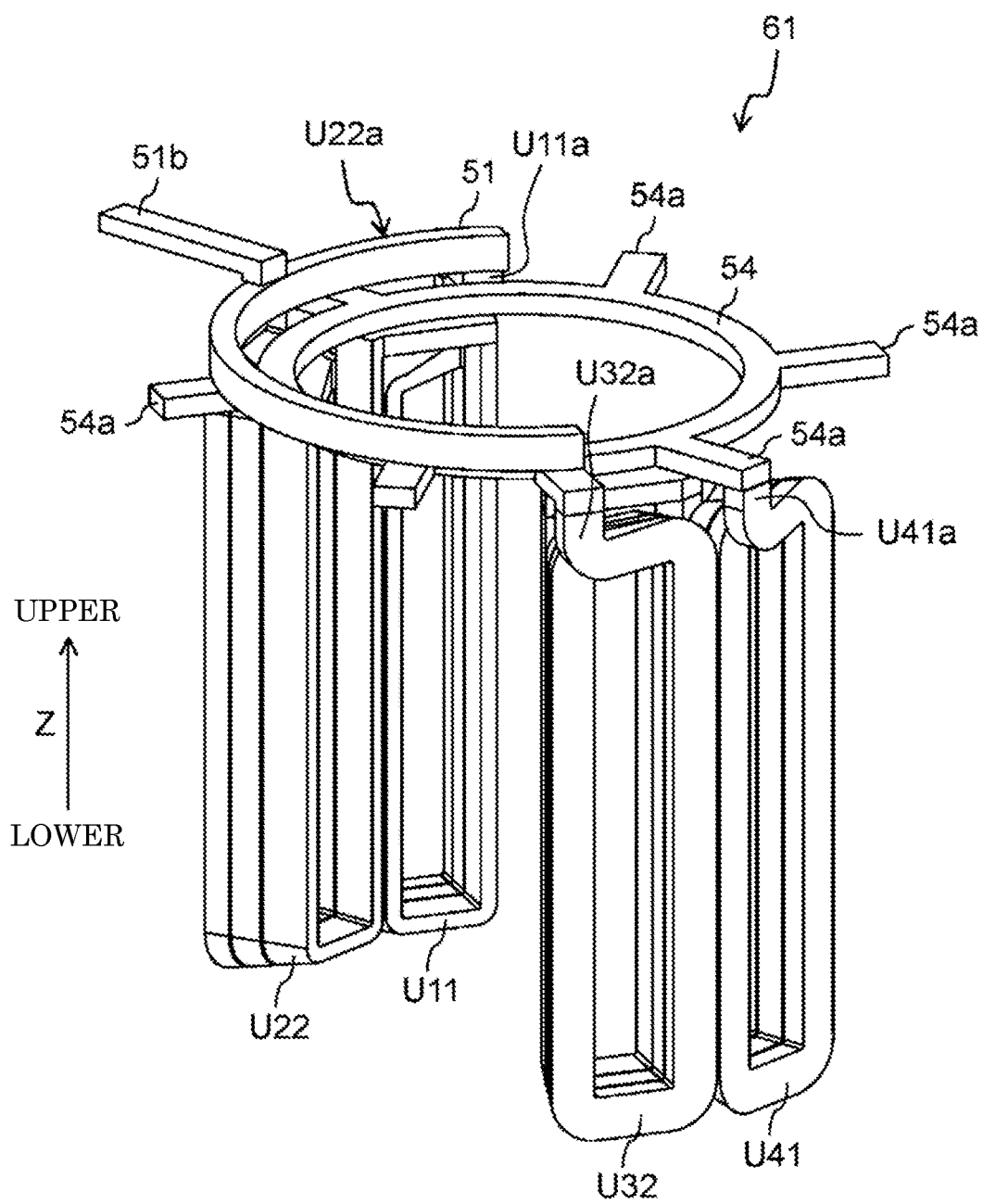
FIG. 2 is a perspective view of a U-phase coil molding including coils and bus bars integrated in the motor according to the exemplary embodiment.

FIG. 2 is a perspective view of a U-phase coil molding including the coils and the bus bars integrated in the motor according to the exemplary embodiment. Coils U11 to U41 and bus bars 51, 54 are integrated to configure coil molding 61. As depicted in FIG. 2, the following description may refer to a first end, provided with bus bar 51, of coil molding 61 as an "upper" end and a second opposite end as a "lower" end in the Z-axis direction.

Bus bar 51 in coil molding 61 is a tabular member having a substantially semiannular shape when viewed in the Z-axis direction. Bus bar 51 has ends respectively integrated with lead parts U11a, U32a of coils U11, U32. Bus bar 51 has lead part 51b electrically connected to a power source (in the U-phase; not depicted).

Bus bar 54 is a tabular member having a substantially annular shape when viewed in the Z-axis direction. Bus bar 54 has the plurality of lead parts 54a. Coils U22, U41 respectively have lead parts U22a, U41a integrated with lead parts 54a, 54a of bus bar 54. Bus bar 54 has potential corresponding to neutral point potential of motor 1.

A set of coils U11, U22 are directly integrated with each other without bus bars 51, 54 being interposed. Another set of coils U32, U41 are directly integrated with each other similarly to coils U11, U22. When current flows to coils U11 to U41, coil U11 and coil U22 having opposite winding directions generate magnetic flux opposite to each other. Coil U32 and coil U41 similarly generate magnetic flux opposite to each other.

Coils U11 to U41 and bus bars 51, 54 are each made of a copper material. Coils U11 to U41 are each made of copper wire having a rectangular section.

Figure 3:
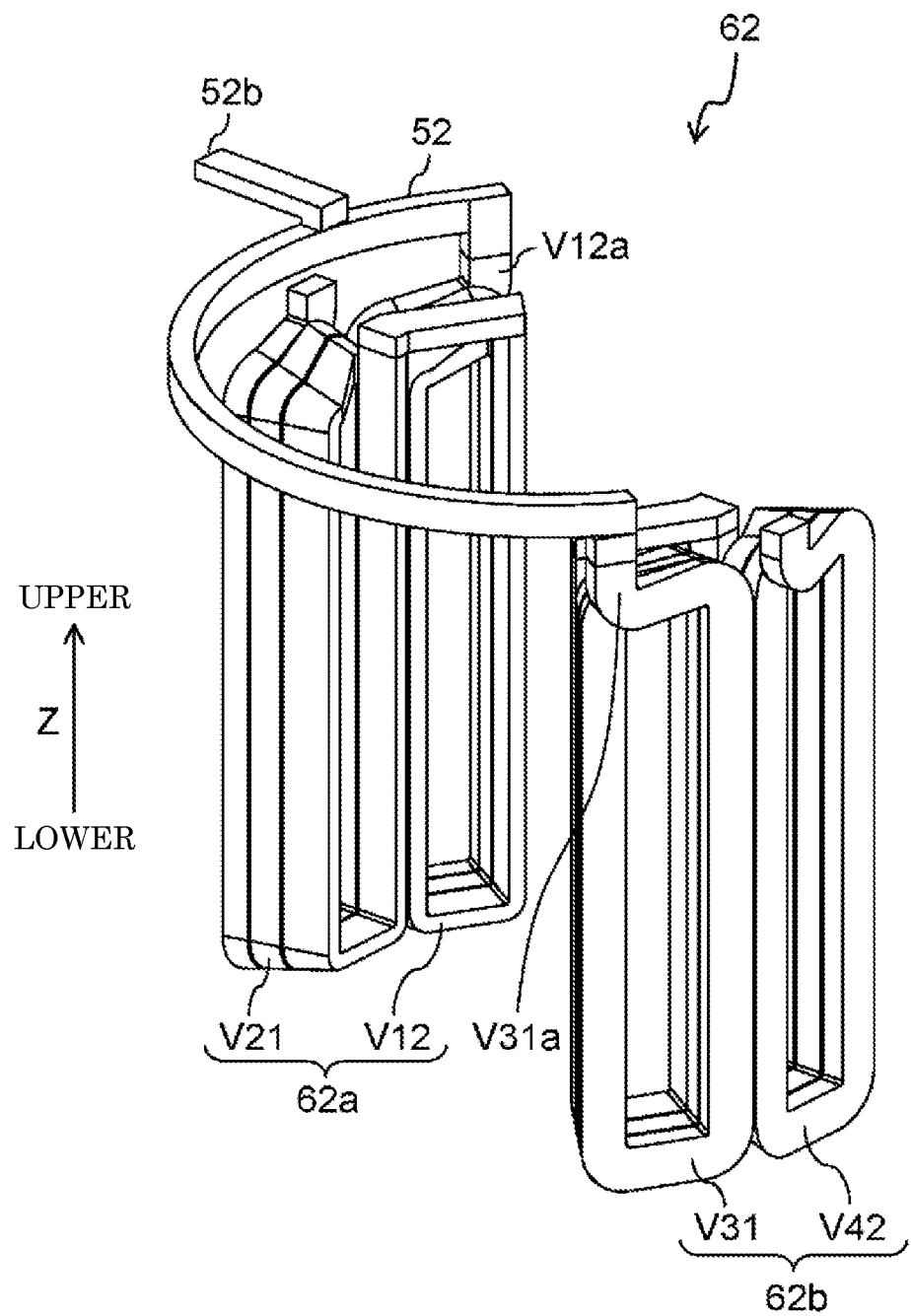
FIG. 3 is a perspective view of a V-phase coil molding in the motor according to the exemplary embodiment.
Figure 4:
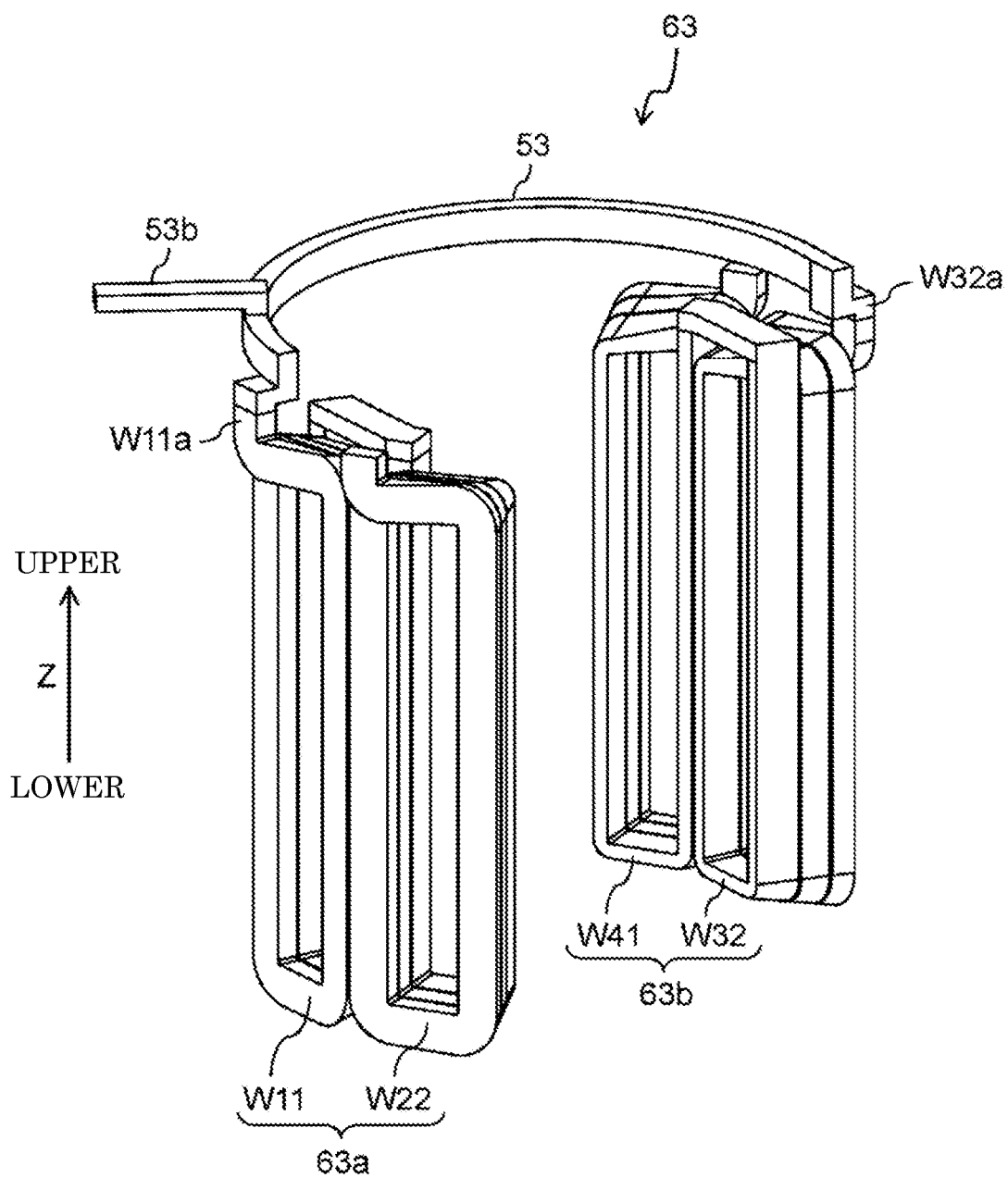
FIG. 4 is a perspective view of a W-phase coil molding in the motor according to the exemplary embodiment.

FIG. 3 is a perspective view of V-phase coil molding 62 in the motor according to the exemplary embodiment. FIG. 4 is a perspective view of W-phase coil molding 63 in the motor according to the exemplary embodiment. As depicted in FIG. 3, bus bar 52 is a tabular member having a substantially semiannular shape when viewed in the Z-axis direction. Bus bar 52 has ends respectively integrated with lead parts V12a, V31a of coils V12, V31. Bus bar 52 has lead part 52b electrically connected to a power source (in the V-phase; not depicted). Among four V-phase coils, the set of adjacent coils V12, V21 are directly integrated with each other similarly to coils U11, U22 and the like. Similarly, the other set of adjacent coils V31, V42 are directly integrated with each other.

Coils V12 to V42 and bus bar 52 are each made of a copper material. Coils V12 to V42 are each made of copper wire having a rectangular section.

As depicted in FIG. 4, bus bar 53 is a tabular member having a substantially semiannular shape when viewed in the Z-axis direction. Bus bar 53 has ends respectively integrated with lead parts W11a, W32a of coils W11, W32. Bus bar 53 has lead part 53b electrically connected to a power source (in the W-phase; not depicted). Among four W-phase coils, a set of adjacent coils W11, W22 are integrated with each other similarly to coils U11, U22 and the like. Another set of adjacent coils W32, W41 are similarly integrated with each other.

Coils W11 to W41 and bus bar 53 are each made of a copper material. Coils W11 to W41 are each made of copper wire having a rectangular section.

Figure 5:
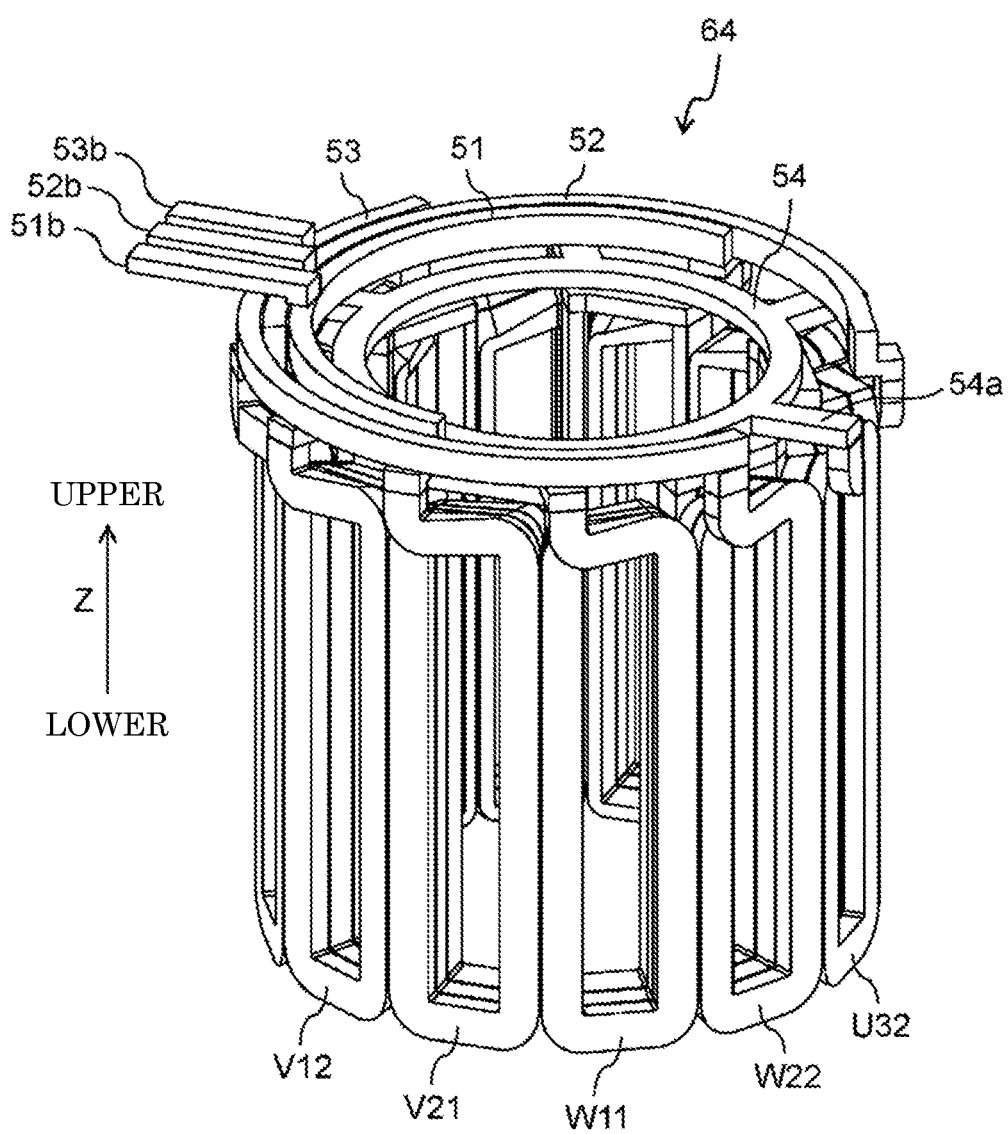
FIG. 5 is a perspective view of a U, V, and W-phase coil molding combined in the motor according to the exemplary embodiment.

FIG. 5 is a perspective view of U, V, and W-phase coil molding 64 combined in the motor according to the exemplary embodiment. As depicted in FIG. 5, coil molding 64 having the respective phases can be integrated with bus bars 51 to 54. However, this may lead to complication in shape and difficulty in formation of the coil molding. For example, it may be difficult to remove a copper material from a casting mold, as to be described later. This may also lead to decrease in assembly aligning margin during assembling coil moldings 61 to 63 to stator 4.

Unless otherwise specified, the following description will thus assume that U-phase coils include coils U11 to U41 integrated with bus bars 51, 54 to configure coil molding 61, V-phase coils include two types of coils, namely, the set of adjacent coils V12, V21 integrated to configure coil molding 62a (see FIG. 3 and FIG. 7C) and the other set of adjacent coils V31, V42 integrated to configure coil molding 62b (see FIG. 3 and FIG. 7C), and W-phase coils include two types of integrated coils similarly to the V-phase coils. Coils V12 to V42 and bus bars 52, 54, as well as coils W11 to W41 and bus bars 53, 54, are electrically connected through joining by fusing, for example. Coil molding 64 depicted in FIG. 5 includes aligned coil moldings 61 to 63 in the respective phases (see FIG. 7D).

Coil groups and the bus bars form integral structures having variations not limited to the above, but can be obviously modified appropriately in accordance with specifications of motor 1, capacity of assembly equipment for stator 4 or the coils, and the like.

(Method of Manufacturing Coil Molding)

Described below is a method of forming a coil molding including a coil and a bus bar integrated with each other, exemplifying coil molding 61 obtained as a casting. V-phase coil moldings 62a, 62b and W-phase coil moldings 63a, 63b (see FIG. 3 and FIG. 4) can be formed in manners similarly to the following manner. In a case where bus bars 51 to 54 and coil groups U11 to W41 in the U, V, and W phases are integrated together, the following casting mold needs to have a cavity having a shape corresponding to all the coils and all the bus bars incorporated together.

Figure 6A:
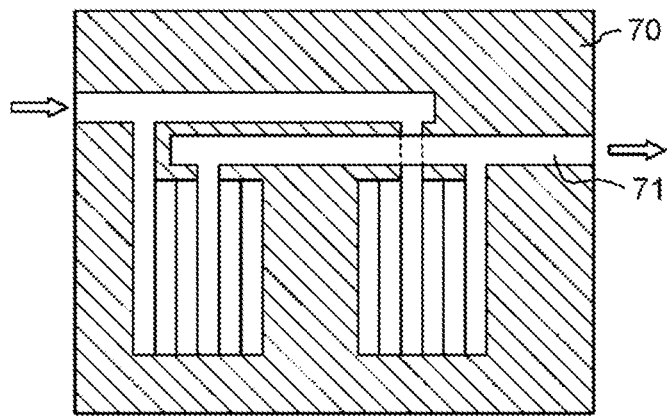
FIG. 6A is an explanatory view on a method of manufacturing a coil molding in the motor according to the exemplary embodiment.
Figure 6B:
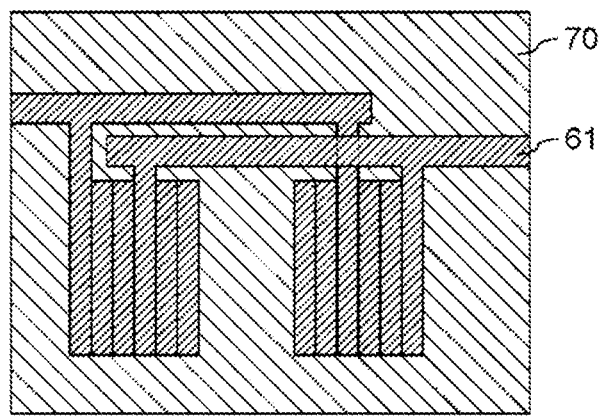
FIG. 6B is another explanatory view on the method of manufacturing the coil molding in the motor according to the exemplary embodiment.
Figure 6C:
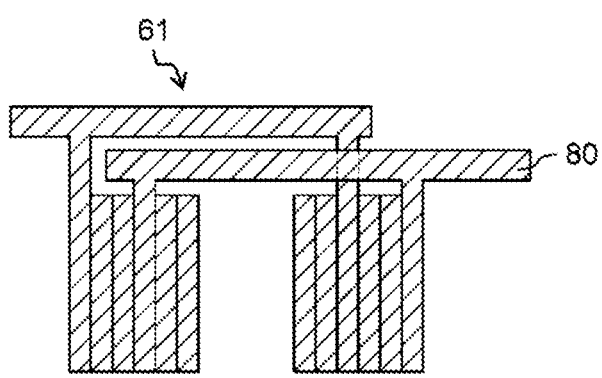
FIG. 6C is still another explanatory view on the method of manufacturing the coil molding in the motor according to the exemplary embodiment.

FIG. 6A, FIG. 6B, and FIG. 6C are explanatory views on a method of manufacturing coil molding 61 in the motor according to the exemplary embodiment. Coils U11 to U41 and bus bars 51, 54 are integrally molded by casting copper. Specifically, as depicted in FIG. 6A, casting mold 70 has inner cavity 71 shaped correspondingly to integrated coils U11 to U41, bus bars 51, 54, and lead parts of coils U11 to U41 and bus bars 51, 54. Molten copper is pressurized and poured into cavity 71, and the copper is cooled to be solidified to obtain coil molding 61 as depicted in FIG. 6B. Coil molding 61 is subsequently removed from casting mold 70, and insulating treatment is applied to an entire surface of coil molding 61 to provide insulating coating 80 as depicted in FIG. 6C. The insulating treatment is executed to electrically insulate coil molding 61 from stator 4. The insulating treatment may be executed through electrodeposition coating or the like, but the present disclosure is not particularly limited to this case.

A metallic material for casting may not be copper, and may be selected from aluminum, zinc, magnesium, iron, steel use stainless (SUS), brass, and the like. The method of manufacturing a molded product is not limited to casting, but can adopt any other technique. For example, the molded product can be carved out of a solid material selected from copper, aluminum, zinc, magnesium, iron, SUS, brass, and the like. Still alternatively, separately molded components may be joined together through cold pressure welding, welding, or the like.

(Method of Assembling Stator)

Figure 7A:
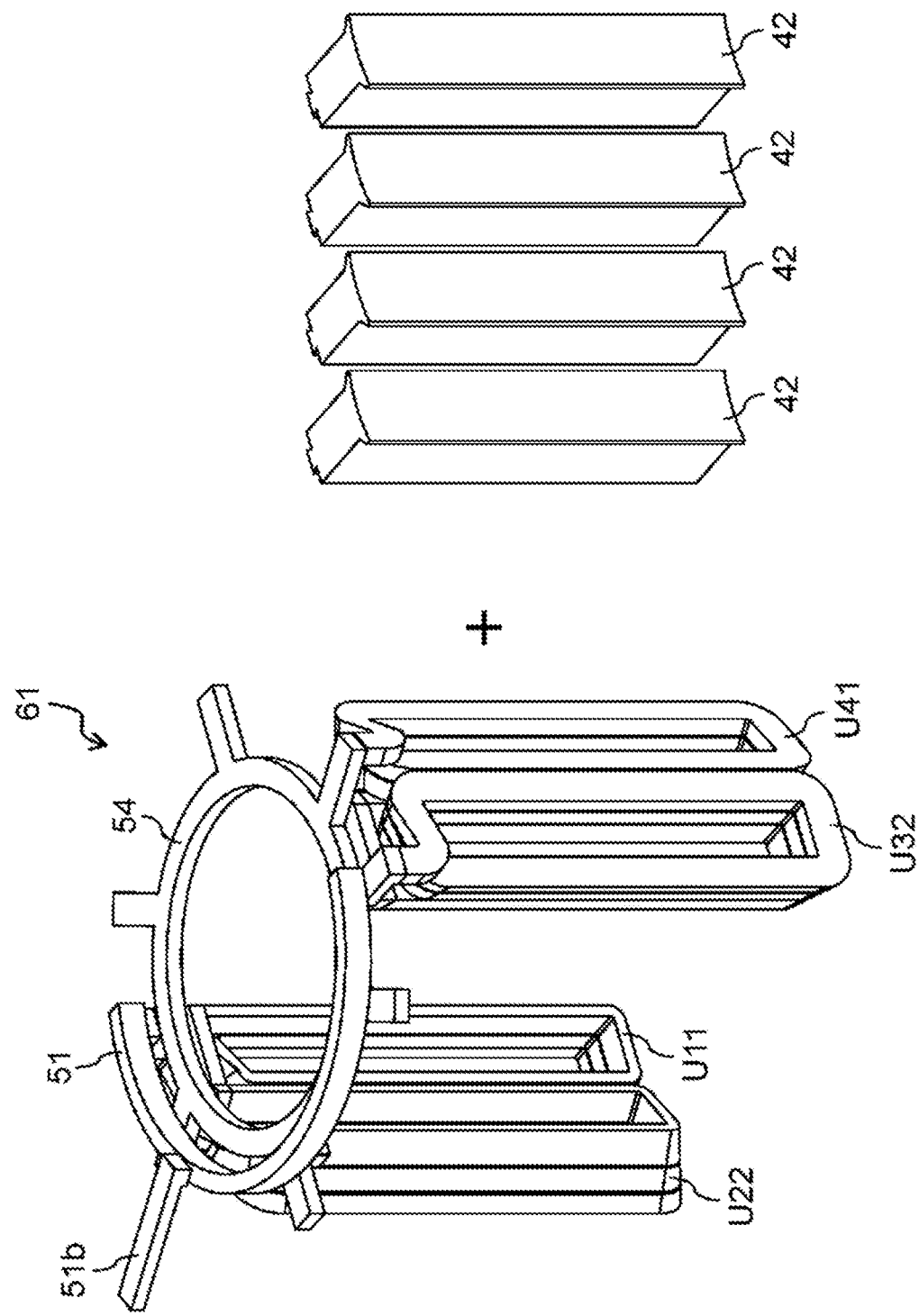
FIG. 7A is an explanatory view on a method of assembling a stator in the motor according to the exemplary embodiment.
Figure 7B:
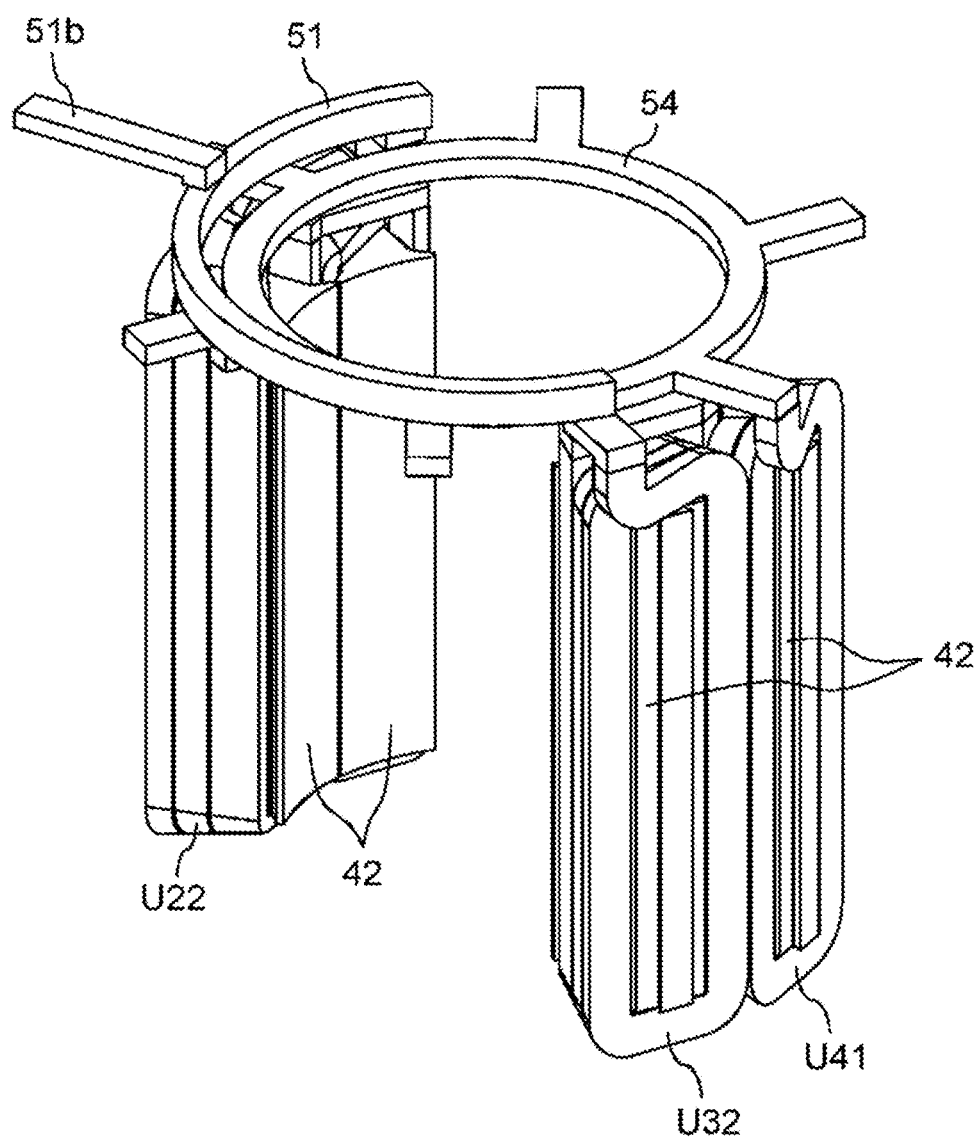
FIG. 7B is a different explanatory view on the method of assembling the stator in the motor according to the exemplary embodiment.
Figure 7C:
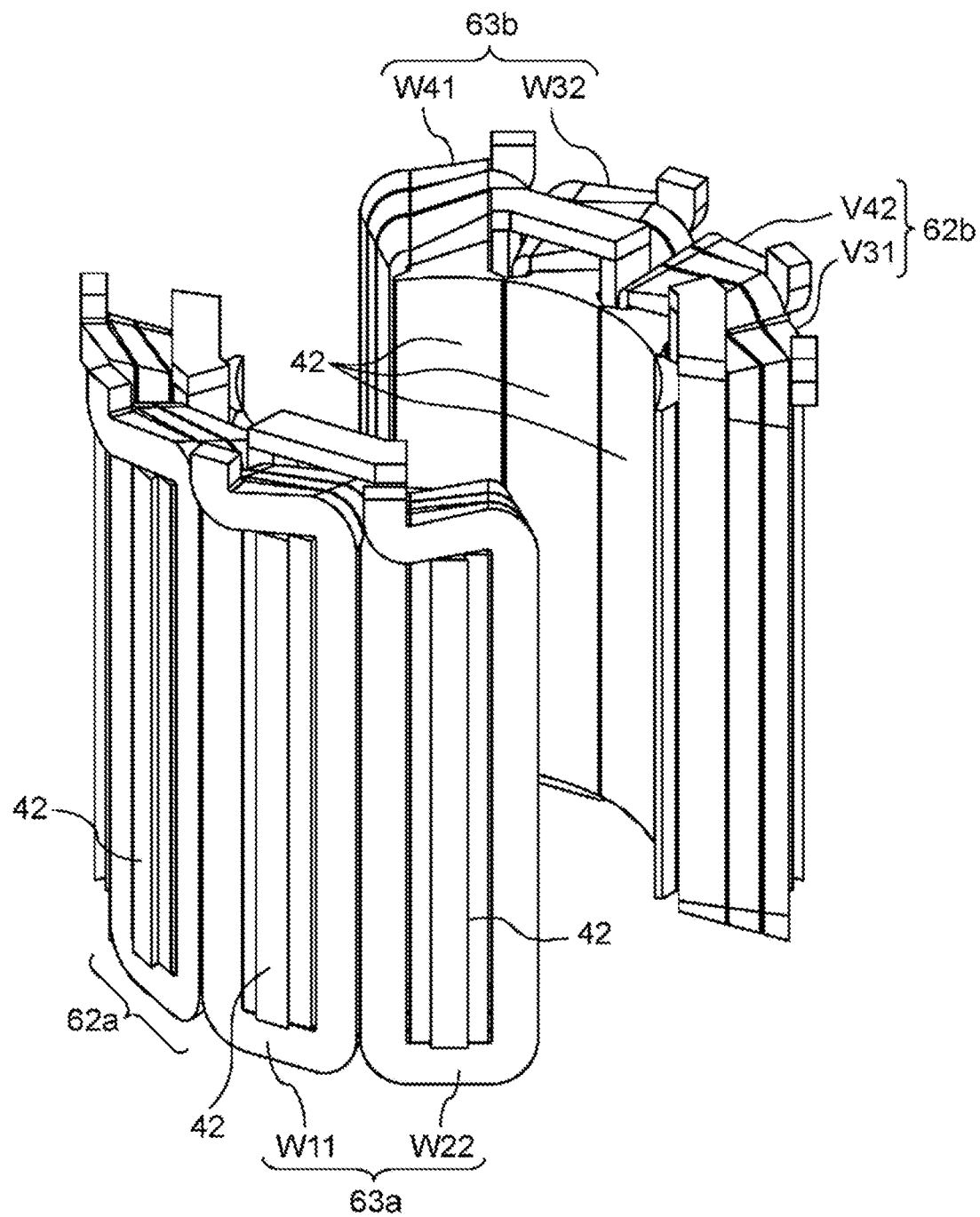
FIG. 7C is a different explanatory view on the method of assembling the stator in the motor according to the exemplary embodiment.

Described next is a method of assembling stator 4. FIG. 7A to FIG. 7F are explanatory views on the method of assembling stator 4 in the motor according to the exemplary embodiment. There are prepared coil molding 61 and four teeth 42 (FIG. 7A). Teeth 42 are respectively attached to four coils U11 to U41 in coil molding 61 (FIG. 7B). There are prepared V-phase coil moldings 62a, 62b and W-phase coil moldings 63a, 63b, and teeth 42 are respectively attached to coils V12 to W41 (FIG. 7C).

Figure 7D:
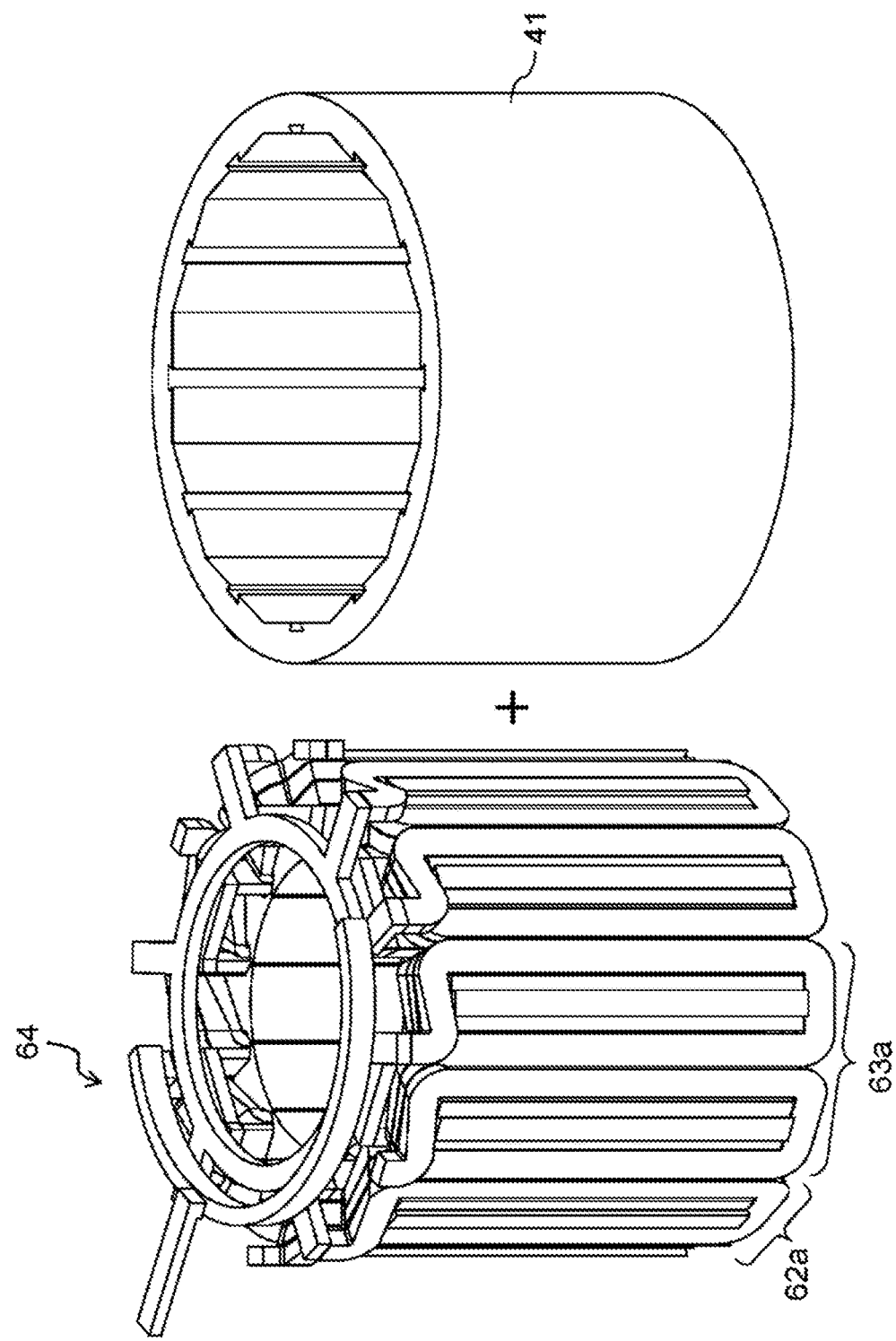
FIG. 7D is a different explanatory view on the method of assembling the stator in the motor according to the exemplary embodiment.
Figure 7E:
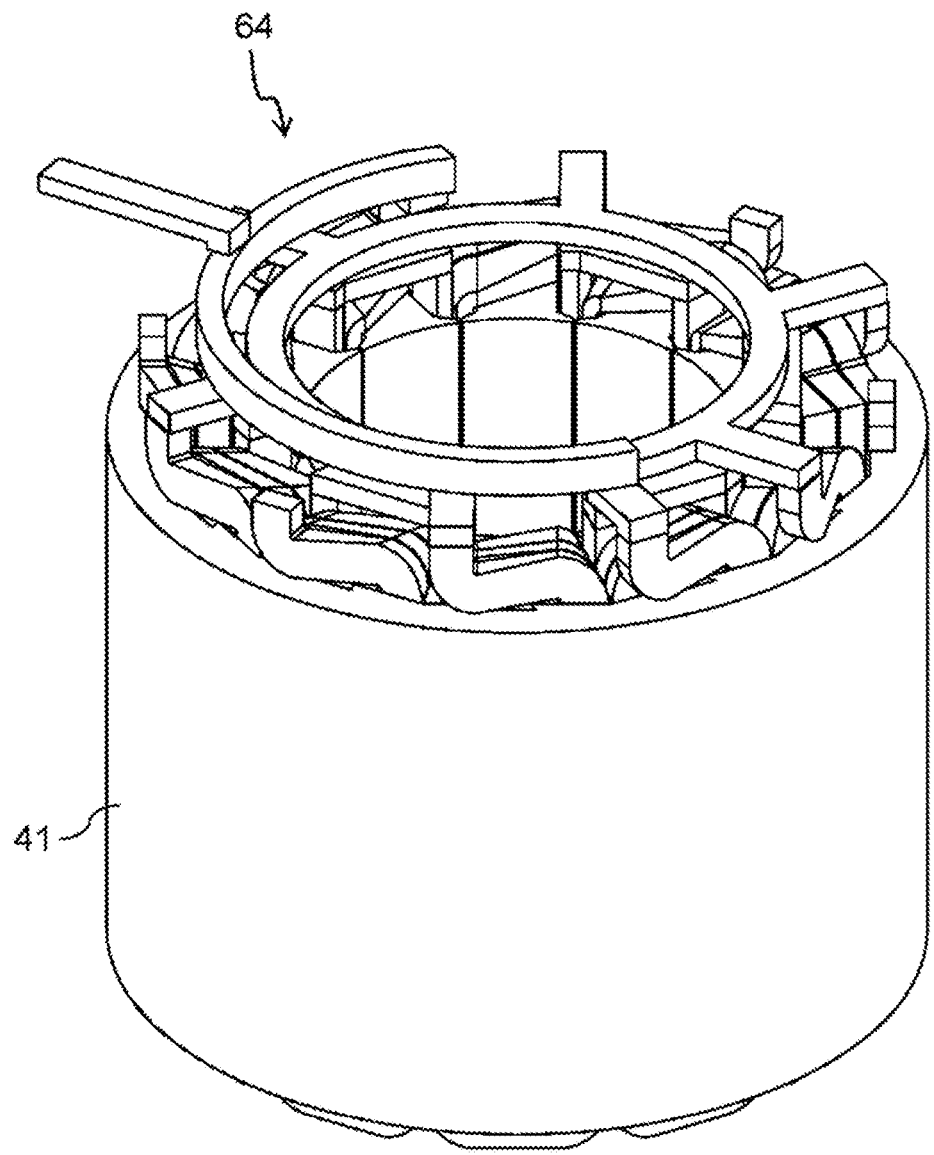
FIG. 7E is a different explanatory view on the method of assembling the stator in the motor according to the exemplary embodiment.
Figure 7F:
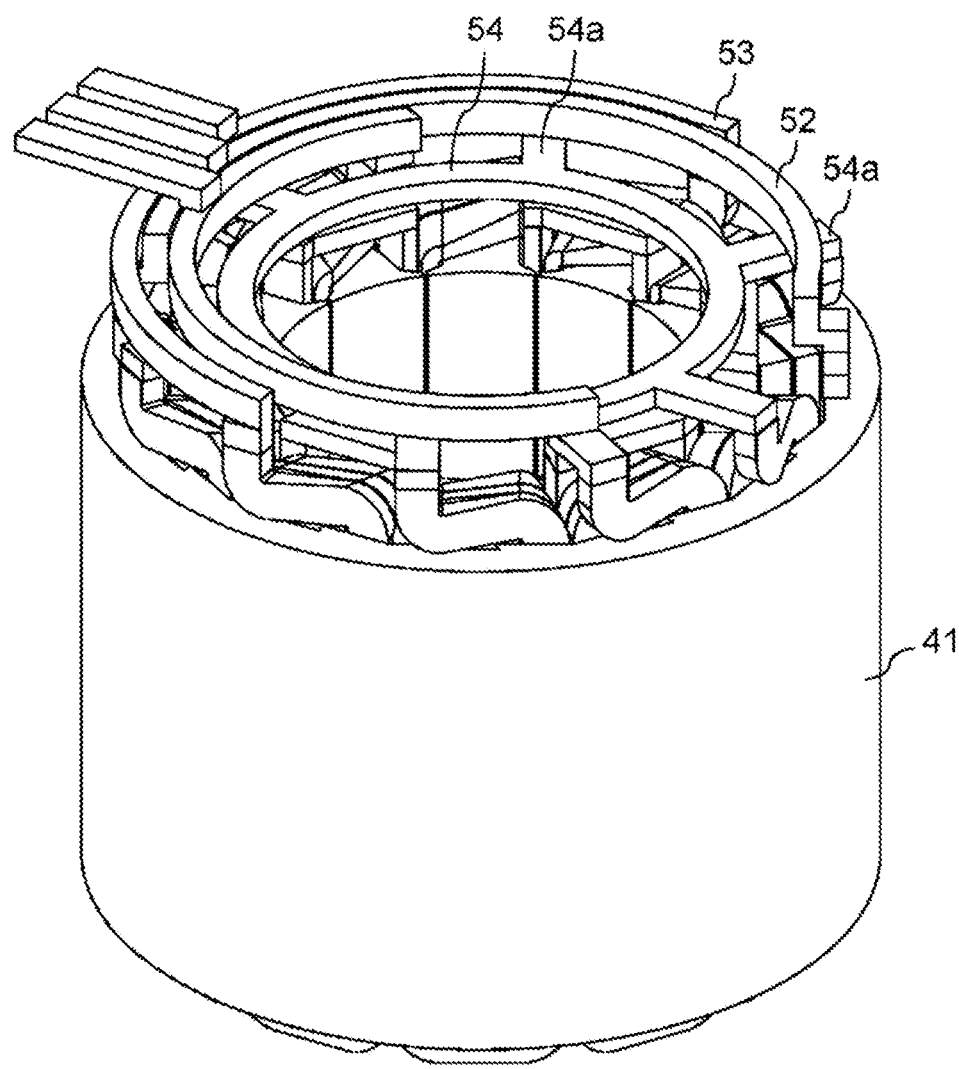
FIG. 7F is a different explanatory view on the method of assembling the stator in the motor according to the exemplary embodiment.

Coil moldings 61 to 63b provided with teeth 42 are subsequently aligned at predetermined positions to be combined and form an annular shape. Stator core 41 is prepared (FIG. 7D). Coil molding 64 including aligned coil moldings 61 to 63b is attached to stator core 41 (FIG. 7E). Through joining by fusing or the like, the both ends of bus bar 52 and lead parts 54a, 54a of bus bar 54 are respectively joined to four lead parts of V-phase coil moldings 62a, 62b. Similarly, the both ends of bus bar 53 and lead parts 54a, 54a of bus bar 54 are respectively joined to four lead parts of W-phase coil moldings 63a, 63b to complete assembly of stator 4 (FIG. 7F).

Bus bars 52 to 54 and coil moldings 62a to 63b in the V and W phases may be joined subsequently to the process depicted in FIG. 7D.

As described above, the present exemplary embodiment provides coil molding 61 including coils U11 to U41 and bus bars 51, 54 molded integrally. The present exemplary embodiment thus achieves elimination of a process of winding the coils and a process of connecting the coils and the bus bars. Motor 1 including the coil molding thus obtained achieves reduction in manufacturing cost for motor 1.

Furthermore, coil U11 and coil U22 corresponding the U-phase and the U-bar phase, respectively, are directly integrated with each other. This configuration eliminates connecting wire between these phases. This configuration also eliminates a connection process between connecting wire and the coils. Coil U32, coil U41, coils V21 to V42, and coils W11 to W41 similarly need neither connecting wire nor a process of connecting the connecting wire.

Furthermore, insulating treatment can be applied to the surfaces of coil moldings 61 to 63b at one time, achieving simplification of the process.

At least either the coil and the bus bar or a plurality of coils are molded integrally. This facilitates handling coil moldings 61 to 63b provided with teeth 42, and achieves reduction in assembling cost for stator 4.

Coils U11 to U41, V12 to V42, and W11 to W41 are each made of copper wire having a rectangular section, and can thus be disposed in slots 43 without any gaps. This leads to improvement in space factor of the coils. This configuration accordingly enables reduction in size of motor 1 and improvement in torque density.

As described above, the present exemplary embodiment provides coil molding 61 that is attached to stator 4 of motor 1 and includes coils U11 to U41 wound respectively around the plurality of teeth 42 of stator 4 and bus bars 51, 54 connected to coils U11 to U41 and molded integrally with coils U11 to U41, bus bars 51, 54 each having a substantially semiannular shape when viewed from the central axis of motor 1.

This configuration achieves elimination of a process of winding the coils and a process of connecting the coils and the bus bars for reduction in manufacturing cost for motor 1.

The present exemplary embodiment provides coil molding 61 including the set of coils U11, U22 wound respectively around the plurality of teeth 42, the set of coils U11, U22 being molded integrally with each other.

This configuration achieves elimination of a process of winding the coils and a process of connecting the coils for reduction in manufacturing cost for motor 1.

Integrally molded coils U11, U22 are each preferred to have a natural number of turns.

The set of integrally molded coils U11, U22 may include first coil U11 having a clockwise winding direction when viewed from the center of the motor, and second coil U22 having a counterclockwise winding direction when viewed from the center of the motor.

The set of coils U11, U22 and at least one of bus bars 51, 54 are preferred to be molded integrally.

The set of integrally molded coils U11, U22 may be disposed adjacent to each other.

The present exemplary embodiment provides motor 1 including the cover case accommodating shaft 2, rotor 3 provided in contact with the outer circumference of shaft 2, and stator 4 disposed outside rotor 3 and constantly spaced apart from rotor 3. Stator 4 includes stator core 41 having a substantially annular shape, the plurality of teeth 42 provided at equal intervals along the inner circumference of stator core 41, slots 43 each provided between adjacent teeth 42, and coil molding 61 attached to teeth 42 and disposed in slots 43.

This configuration achieves motor 1 including coil molding 61 manufactured without a process of winding coils or a process of connecting the coil and a bus bar or connecting the coils, for reduction in manufacturing cost for motor 1.

The present exemplary embodiment further provides a method of manufacturing coil molding 61, the method including: preparing casting mold 70 having inner cavity 71 shaped correspondingly to integration between at least one of coils U11 to U41 and at least one of bus bars 51, 54; pouring, into cavity 71, a single molten metallic material selected from copper, aluminum, zinc, magnesium, iron, steel use stainless (SUS), and brass; cooling casting mold 70 to solidify the metallic material in cavity 71; removing the solidified metallic material from casting mold 70 to obtain coil molding 61; and applying insulating treatment to an entire surface of coil molding 61.

This configuration achieves elimination of a process of winding the coils and a process of connecting the coils and the bus bars for reduction in manufacturing cost for motor 1.

The present exemplary embodiment also provides a method of manufacturing coil molding 61, the method including: preparing casting mold 70 having inner cavity 71 shaped correspondingly to integration of at least one set of adjacent coils U11, U22; pouring, into cavity 71, a single molten metallic material selected from copper, aluminum, zinc, magnesium, iron, steel use stainless (SUS), and brass; cooling casting mold 70 to solidify the metallic material in cavity 71; removing the solidified metallic material from casting mold 70 to obtain coil molding 61; and applying insulating treatment to an entire surface of coil molding 61.

This configuration achieves elimination of a process of winding the coils and a process of connecting the coils for reduction in manufacturing cost for motor 1.

The present exemplary embodiment further provides a method of assembling a stator, the method including: preparing coil molding 61; attaching teeth 42 of stator 4 to coils U11 to U41 of coil molding 61; attaching coil molding 61 provided with teeth 42 to stator core 41; and joining coil molding 61 and bus bar 53 not integrated with coil molding 61.

This achieves reduction in assembling cost for stator 4.

In coil molding 61 according to the present exemplary embodiment, bus bars 51, 54 each have a plane being parallel to the central axis and having a sectional shape, and coils U11 to U41 facing each other with teeth 42 being interposed each have a section being vertical to the central axis and having a shape that may be different from the sectional shape of bus bars 51, 54.

In the method of manufacturing coil molding 61 according to the present exemplary embodiment, at least one of coils U1f to U41 and at least one of bus bars 51, 54 may be integrated with each other by material joining.

Modification Example

Figure 8:
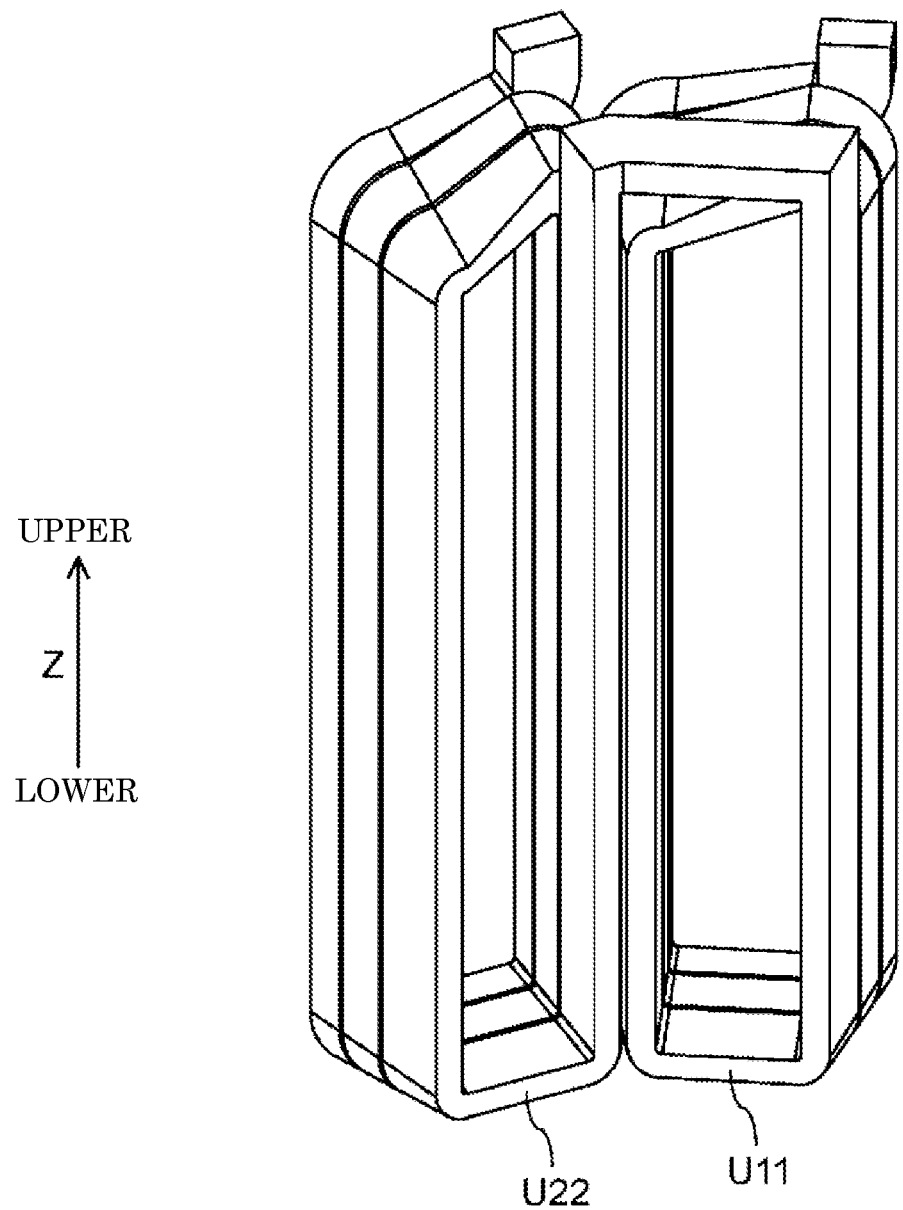
FIG. 8 is an enlarged view of part of the coil molding depicted in FIG. 2.

FIG. 8 is an enlarged view of part of the coil molding depicted in FIG. 2. As depicted in FIG. 2 to FIG. 4, coils U11 to U41, V12 to V42, and W11 to W41 according to the exemplary embodiment described above each have a natural number of winding times (hereinafter, called a number of turns). As depicted in FIG. 8 or the like, coil U11 includes winding wire having three turns and then extending from above toward coil U22 to be integrated with coil U22.

Figure 9:
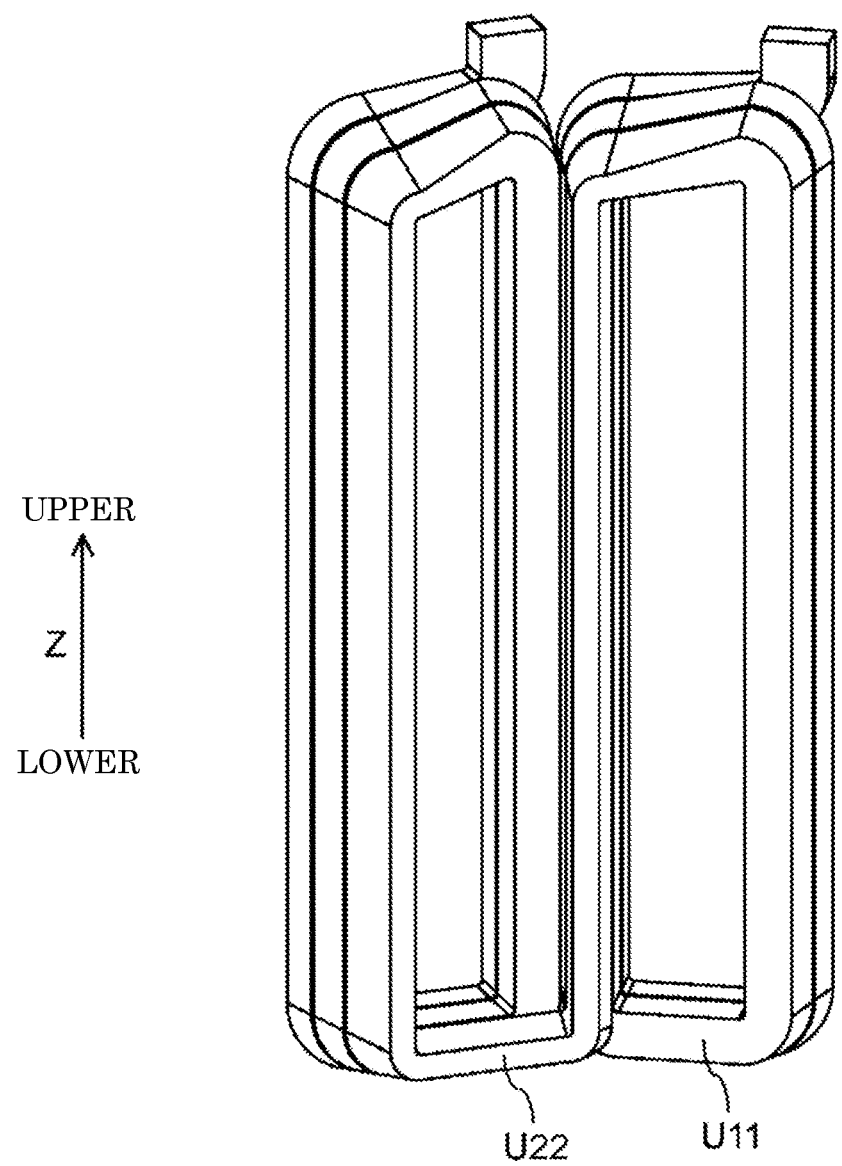
FIG. 9 is a perspective view of a coil molding according to a modification example.

FIG. 9 is a perspective view of a coil molding according to a modification example. As depicted in FIG. 9, the winding wire of coil U11 may alternatively have two turns and then extend from below to be integrated. That is, each coil may have 2.5 turns. Such a configuration slightly decreases the number of turns of the coil for each one of the teeth. This configuration reduces the numbers of turns for two coils, in other words, wire length of the coils. This leads to material cost reduction. This configuration also decreases winding density above the coils. This leads to increase in space margin above the coils. This configuration facilitates joining by fusing or the like.

The above exemplary embodiment exemplifies the structure including adjacent coils directly integrated with each other. This structure achieves decrease in contact point with the bus bar and increase in space above the coils. This structure is effectively applied for reduction in the number or disposition density of the lead parts. The present disclosure is not particularly limited to this case. There may be provided an integral structure including a bus bar, in which case, the adjacent coils are not directly integrated with each other.

The above exemplary embodiment exemplifies integration of the coil having the clockwise winding direction and the coil having the counterclockwise winding direction. Alternatively, coils each having the clockwise winding direction or coils each having the counterclockwise winding direction may be integrated with each other. Disposition of these coils may be modified appropriately in accordance with the number of poles, the number of slots, or the like of motor 1.

The coil having the clockwise winding direction and the coil having the counterclockwise winding direction may be disposed to be spaced apart from each other with a bus bar being interposed.

The exemplary embodiment as well as the modification example exemplify the coil molding including the plurality of coils molded integrally with the plurality of bus bars. Alternatively, a plurality of coils and a single bus bar, for example, coils U11 to U41 and bus bar 51, may be molded integrally. Still alternatively, a single coil such as coil U11 and bus bar 51 may be molded integrally with each other. Each of these cases achieves elimination of part of a process of winding the coils or part of a process of connecting the coils and the bus bars, for reduction in assembling cost for motor 1.

The above exemplary embodiment provides three as the number of turns of each of coils U11 to U41, V12 to V42, and W11 to W41. The present disclosure is not particularly limited to this case. The number of turns may be changed appropriately in accordance with performance specification of motor 1 or the like.

As described above, coils U11, U22 molded integrally in coil molding 61 according to the above exemplary embodiment may each have a number of turns calculated by multiplying a natural number by a number obtained through adding an integer more than or equal to one and ½.

INDUSTRIAL APPLICABILITY

The present disclosure provides a coil molding having an improved space factor of a coil in a stator. The coil molding also achieves elimination of a process of winding the coil and a process of connecting the coil and a bus bar. The present disclosure is thus useful for achievement of high efficiency and low cost for a motor.

REFERENCE MARKS IN THE DRAWINGS

1: motor
2: shaft
3: rotor
4: stator
31: magnet
41: stator core
42: teeth
43: slot
51, 52, 53, 54: bus bar
61, 62, 62a, 62b, 63, 63a, 63b, 64: coil molding
70: casting mold
71: cavity
80: insulating coating
U11, U22, U32, U41, V12, V21, V31, V42, W11, W22, W32, W41: coil
U11a, U22a, U32a, U41a, V12a, V31a, W11a, W32a, 51b, 52b, 53b, 54a: lead part

The invention claimed is:

1. A coil molding attached to a stator of a motor, the coil molding comprising: a coil wound around each of teeth of the stator; and a bus bar connected to the coil and molded integrally with the coil, the bus bar having a substantially semiannular shape when viewed from a central axis of the motor, wherein the coil molding is configured so that the bus bar has at least both ends respectively integrated with the coil; the bus bar and the coil are attached to a stator core while the bus bar and the coil are integrated by using a single metallic material; each of the teeth of the stator has a first surface and a second surface, which is opposite the first surface; and each of the teeth of the stator has a protrusion formed on the second surface, and the protrusion engages a corresponding notch formed in an inner surface of the stator core; wherein mutually adjacent coils are integrated with one another, without being connected through the bus bar.

2. A motor comprising a cover case accommodating a shaft, a rotor provided in contact with an outer circumference of the shaft, and the stator disposed outside the rotor and constantly spaced apart from the rotor, wherein
the stator includes:
a stator core having a substantially annular shape,
a plurality of teeth provided at equal intervals along an inner circumference of the stator core,
slots each provided between the teeth, and
the coil molding according to claim 1 attached to the slots and the coil is wound around each of the plurality of teeth.

3. The coil molding according to claim 1, wherein
the bus bar has a plane being parallel to the central axis and having a sectional shape, and
a plurality of the coils facing each other with the teeth being interposed each have a section being vertical to the central axis and having a shape different from the sectional shape of the bus bar.

4. The coil molding according to claim 1, wherein the coil and the bus bar have the same composition.

5. The coil molding according to claim 1, wherein the coil and the bus bar are a unitary member.

6. The coil molding according to claim 1, wherein the coil and the bus bar are integrally formed as a single member.

7. The coil molding according to claim 1, wherein a set of coils wound respectively around the plurality of teeth are molded integrally with each other.

8. The coil molding according to claim 7, wherein the integrally molded coils each have a natural number of turns.

9. The coil molding according to claim 7, wherein the integrally molded coils each have a number of turns, the number being calculated by multiplying a natural number by a number obtained through adding an integer more than or equal to one and ½.

10. The coil molding according to claim 7, wherein the set of integrally molded coils include a first coil having a clockwise winding direction when viewed from a center of the motor, and a second coil having a counterclockwise winding direction when viewed from the center of the motor.

11. The coil molding according to claim 7, wherein the set of coils and at least one bus bar are molded integrally.

12. The coil molding according to claim 7, wherein the set of integrally molded coils are disposed adjacent to each other.

* * * * *